(12) United States Patent
Takegami et al.

(10) Patent No.: US 10,317,598 B2
(45) Date of Patent: *Jun. 11, 2019

(54) OPTICAL FILM, POLARIZATION PLATE, TRANSPARENT CONDUCTIVE FILM, SURFACE PROTECTION FILM, AND LIQUID CRYSTAL DISPLAY APPARATUS HAVING NEGATIVE BIREFRINGENCE

(71) Applicant: FUJIFILM Corporation, Tokyo (JP)

(72) Inventors: Ryuta Takegami, Shizuoka (JP); Naoyoshi Yamada, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 14/979,553

(22) Filed: Dec. 28, 2015

(65) Prior Publication Data

US 2016/0109632 A1 Apr. 21, 2016

Related U.S. Application Data

(63) Continuation of application No. PCT/JP2014/065034, filed on Jun. 6, 2014.

(30) Foreign Application Priority Data

Jun. 26, 2013 (JP) ................................. 2013-134055

(51) Int. Cl.
G02B 5/30 (2006.01)

(52) U.S. Cl.
CPC ......... *G02B 5/3083* (2013.01); *G02B 5/3033* (2013.01); *G02B 5/3058* (2013.01)

(58) Field of Classification Search
CPC ... G02B 1/08; G02B 1/14; G02B 5/30; G02B 5/3025; G02B 5/3033; G02B 5/3083; G02F 1/13; G02F 1/133528; G02F 1/13363; G02F 1/133634; G02F 2001/133635
USPC .......... 359/483.041, 489.01, 489.07; 362/19; 353/20; 349/96, 117, 118, 119, 120, 121
See application file for complete search history.

(56) References Cited

U.S. PATENT DOCUMENTS

| | | |
|---|---|---|
| 4,583,825 A | 4/1986 | Buzak |
| 4,680,353 A | 7/1987 | Ishihara et al. |
| 5,272,229 A | 12/1993 | Tomotsu et al. |
| 5,410,422 A | 4/1995 | Bos |
| 5,430,001 A | 7/1995 | Tomotsu et al. |
| RE35,289 E | 7/1996 | Ishihara et al. |
| 6,253,668 B1 | 7/2001 | Lee |
| 6,458,474 B1 | 10/2002 | Okada et al. |
| 6,461,747 B1 | 10/2002 | Okada et al. |
| 6,506,507 B1 | 1/2003 | Okada et al. |
| 6,528,648 B2 | 3/2003 | Matsumoto et al. |
| 6,614,174 B1 | 9/2003 | Urabe et al. |
| 6,620,529 B1 | 9/2003 | Ise et al. |
| 6,635,364 B1 | 10/2003 | Igarashi |
| 6,656,612 B2 | 12/2003 | Okada et al. |
| 6,696,178 B2 | 2/2004 | Igarashi |
| 6,821,645 B2 | 11/2004 | Igarashi et al. |
| 6,830,836 B2 | 12/2004 | Okada et al. |
| 6,835,474 B2 | 12/2004 | Okada et al. |
| 6,835,845 B2 | 12/2004 | Okada et al. |
| 6,969,291 B2 | 11/2005 | Urabe et al. |
| 7,083,864 B2 | 8/2006 | Igarashi |
| 7,101,632 B2 | 9/2006 | Igarashi |
| 7,118,811 B2 | 10/2006 | Ise et al. |
| 7,144,688 B2 | 12/2006 | Nakagawa et al. |
| 7,238,437 B2 | 7/2007 | Igarashi et al. |
| 7,381,520 B2 | 6/2008 | Nakagawa et al. |
| 7,951,472 B2 | 5/2011 | Igarashi et al. |
| 7,951,945 B2 | 5/2011 | Igarashi et al. |
| 7,951,946 B2 | 5/2011 | Igarashi et al. |
| 7,951,947 B2 | 5/2011 | Igarashi et al. |
| 7,994,319 B2 | 8/2011 | Igarashi et al. |
| 8,034,935 B2 | 10/2011 | Igarashi et al. |
| 8,247,964 B2 | 8/2012 | Igarashi et al. |
| 8,383,331 B2 | 2/2013 | Nakamura et al. |
| 8,742,108 B2 | 6/2014 | Igarashi et al. |
| 9,050,763 B2 | 6/2015 | Hatano et al. |
| 10,067,387 B2 * | 9/2018 | Yamada ................ H01L 51/524 |
| 2001/0008711 A1 | 7/2001 | Igarashi |
| 2001/0019782 A1 | 9/2001 | Igarashi et al. |
| 2002/0150929 A1 | 10/2002 | Matsumoto et al. |
| 2003/0080323 A1 | 5/2003 | Okada et al. |
| 2003/0091861 A1 | 5/2003 | Okada et al. |

(Continued)

FOREIGN PATENT DOCUMENTS

| | | |
|---|---|---|
| CN | 101508166 | 8/2009 |
| JP | S62-187708 | 8/1987 |

(Continued)

OTHER PUBLICATIONS

English translation of JP2008-146003A, published Jun. 26, 2008.*
"Written Opinion of the International Searching Authority of PCT/JP2014/065034", dated Aug. 26, 2014, which is English translation of "Written Opinion of the International Searching Authority", pp. 1-10.
"International Search Report (Form PCT/ISA/210) of PCT/JP2014/065034", dated Aug. 26, 2014, with English translation thereof, pp. 1-5.

(Continued)

*Primary Examiner* — Arnel C Lavarias
(74) *Attorney, Agent, or Firm* — JCIPRNET

(57) ABSTRACT

An optical film in which heat resistance or moisture resistance is excellent, and visibility is able to be sufficiently ensured. In the optical film used in a display apparatus including a polarizer, Re is 1,000 nm to 30,000 nm, and Rth is −30,000 nm to −1,000 nm. Further, a polarization plate including the optical film, a transparent conductive film including the optical film, a surface protection film including the optical film including the optical film, and a liquid crystal display apparatus including the optical film.

12 Claims, No Drawings

(56) References Cited

U.S. PATENT DOCUMENTS

| | | |
|---|---|---|
| 2003/0134148 A1 | 7/2003 | Okada et al. |
| 2004/0048102 A1 | 3/2004 | Igarashi |
| 2004/0062952 A1 | 4/2004 | Okada et al. |
| 2004/0090175 A1 | 5/2004 | Urabe et al. |
| 2004/0115572 A1 | 6/2004 | Tsukada et al. |
| 2004/0137274 A1 | 7/2004 | Igarashi |
| 2004/0146745 A1 | 7/2004 | Ise et al. |
| 2004/0234910 A1 | 11/2004 | Nakagawa et al. |
| 2005/0003233 A1 | 1/2005 | Igarashi et al. |
| 2006/0014113 A1 | 1/2006 | Nakagawa |
| 2006/0176425 A1 | 8/2006 | Ito et al. |
| 2006/0204908 A1 | 9/2006 | Nakagawa et al. |
| 2007/0048461 A1 | 3/2007 | Nakajima et al. |
| 2007/0231602 A1 | 10/2007 | Igarashi et al. |
| 2008/0068545 A1 | 3/2008 | Doi et al. |
| 2009/0316095 A1 | 12/2009 | Do et al. |
| 2010/0171113 A1 | 7/2010 | Igarashi et al. |
| 2010/0174069 A1 | 7/2010 | Igarashi et al. |
| 2010/0174070 A1 | 7/2010 | Igarashi et al. |
| 2010/0174071 A1 | 7/2010 | Igarashi et al. |
| 2010/0240895 A1 | 9/2010 | Igarashi et al. |
| 2011/0071292 A1 | 3/2011 | Igarashi et al. |
| 2011/0071293 A1 | 3/2011 | Igarashi et al. |
| 2011/0177289 A1 | 7/2011 | Takegami |
| 2011/0275021 A1 | 11/2011 | Nakamura et al. |
| 2012/0004410 A1 | 1/2012 | Igarashi et al. |
| 2012/0094071 A1 | 4/2012 | Itoh et al. |
| 2012/0162763 A1 | 6/2012 | Son et al. |
| 2012/0229732 A1 | 9/2012 | Koike et al. |
| 2012/0241199 A1 | 9/2012 | Kobayashi et al. |
| 2012/0250142 A1 | 10/2012 | Kobuchi et al. |
| 2012/0309967 A1 | 12/2012 | Igarashi et al. |
| 2013/0093982 A1 | 4/2013 | Kuroda et al. |
| 2013/0100378 A1 | 4/2013 | Murata et al. |
| 2013/0194211 A1 | 8/2013 | Shinohara et al. |
| 2014/0102764 A1 | 4/2014 | Fujino et al. |
| 2015/0362647 A1* | 12/2015 | Tanimoto ............ G02F 1/13363 428/413 |
| 2016/0109632 A1 | 4/2016 | Takegami et al. |

FOREIGN PATENT DOCUMENTS

| | | |
|---|---|---|
| JP | H02-176625 | 7/1990 |
| JP | H04-249504 | 9/1992 |
| JP | H05-203946 | 8/1993 |
| JP | H05-205643 | 8/1993 |
| JP | H09-306366 | 11/1997 |
| JP | H11-335368 | 12/1999 |
| JP | H11-335661 | 12/1999 |
| JP | 2001-148291 | 5/2001 |
| JP | 2001-181616 | 7/2001 |
| JP | 2001-181617 | 7/2001 |
| JP | 2001-192651 | 7/2001 |
| JP | 2001-192652 | 7/2001 |
| JP | 2001-192653 | 7/2001 |
| JP | 2001-221916 | 8/2001 |
| JP | 2001-231443 | 8/2001 |
| JP | 2001-247859 | 9/2001 |
| JP | 2001-335776 | 12/2001 |
| JP | 2002-056976 | 2/2002 |
| JP | 2002-181617 | 6/2002 |
| JP | 2002-181816 | 6/2002 |
| JP | 2004-085655 | 3/2004 |
| JP | 2004-184693 | 7/2004 |
| JP | 2004-244080 | 9/2004 |
| JP | 2004-334077 | 11/2004 |
| JP | 2005-010752 | 1/2005 |
| JP | 2008-146003 | 6/2008 |
| JP | 2008-225452 | 9/2008 |
| JP | 2008225452 | 9/2008 |
| JP | 2008-250233 | 10/2008 |
| JP | 2009-176608 | 8/2009 |
| JP | 2009-277466 | 11/2009 |
| JP | 2010-078905 | 4/2010 |
| JP | 2010078905 | 4/2010 |
| JP | 2010-137422 | 6/2010 |
| JP | 2010-198799 | 9/2010 |
| JP | 2010-256908 | 11/2010 |
| JP | 2011-034806 | 2/2011 |
| JP | 2011059488 | 3/2011 |
| JP | 2011-197754 | 10/2011 |
| JP | 2011-215646 | 10/2011 |
| JP | 4820451 | 11/2011 |
| JP | 2011-253546 | 12/2011 |
| JP | 2012-025158 | 2/2012 |
| JP | 4888853 | 2/2012 |
| JP | 2012-073646 | 4/2012 |
| JP | 2012073646 | 4/2012 |
| JP | 2012-151095 | 8/2012 |
| JP | 2012-216550 | 11/2012 |
| JP | 2012-256014 | 12/2012 |
| JP | 2013-001009 | 1/2013 |
| JP | 2013-050482 | 3/2013 |
| WO | 2010/114056 | 10/2010 |
| WO | 2010/140275 | 12/2010 |
| WO | 2011/062301 | 5/2011 |
| WO | 2011/162414 | 12/2011 |
| WO | 2013/031659 | 3/2013 |
| WO | 2014208309 | 12/2014 |

OTHER PUBLICATIONS

"Office Action of Japan Counterpart Application" with machine English translation thereof, dated Dec. 6, 2016, p. 1-p. 6, in which the listed references were cited.

"Office Action of Korea Counterpart Application" with machine English translation thereof, dated Dec. 6, 2016, p. 1-p. 8.

"First Office Action of China Counterpart Application" with English translation thereof, dated Mar. 20, 2017, p. 1-p. 14, in which the listed references were cited.

"Office Action of Co-pending US Application," dated Oct. 12, 2017, p. 1-p. 23.

International Preliminary Report on Patentability issued from the International Bureau in counterpart Application No. PCT/JP2015/050002, dated Jul. 21, 2016.

"Written Opinion of the International Searching Authority (Form PCT/ISA/237)" of PCT/JP2015/050002, dated Mar. 17, 2015, with English translation thereof, pp. 1-10.

"International Search Report (Form PCT/ISA/210)" of PCT/JP2015/050002, dated Mar. 17, 2015, with English translation thereof, pp. 1-5.

"Office Action of China Counterpart Application," dated Oct. 29, 2018, with English translation thereof, p. 1-p. 13.

* cited by examiner

OPTICAL FILM, POLARIZATION PLATE, TRANSPARENT CONDUCTIVE FILM, SURFACE PROTECTION FILM, AND LIQUID CRYSTAL DISPLAY APPARATUS HAVING NEGATIVE BIREFRINGENCE

CROSS-REFERENCE TO RELATED APPLICATIONS

This application is a Continuation of PCT International Application No. PCT/JP2014/065034, filed on Jun. 6, 2014, which claims priority under 35 U.S.C. Section 119(a) to Japanese Patent Application No. 2013-134055 filed on Jun. 26, 2013. Each of the above applications is hereby expressly incorporated by reference, in its entirety, into the present application.

BACKGROUND OF THE INVENTION

1. Field of the Invention

The present invention relates to an optical film and a display apparatus. Specifically, the present invention relates to an optical film used in a display apparatus including a polarizer in which retardation (Re) in an in-plane direction and retardation (Rth) in a thickness direction are in a specific range.

2. Description of the Related Art

Recently, a liquid crystal display apparatus (LCD) has been widely used, and has been used in a smart phone, a car navigation, a digital camera, a digital signage, and the like which are used outdoors. In addition, various films have been developed according to development of a liquid crystal display market. In general, a film having comparatively small optical anisotropy has been used as an optical film for an LCD. However, recently, it has been proposed that a polyester film having large optical anisotropy is used by being incorporated in a liquid crystal display apparatus (JP4888853B and JP2012-256014A).

For example, in JP4888853B, a polyester film having retardation (Re) in an in-plane direction of 3,000 nm to 30,000 nm is disclosed. In addition, in JP2012-256014A, a polyester film having retardation (Re) in an in-plane direction of 3,000 nm to 30,000 nm is disclosed in which Re/Rth≥0.2. Furthermore, retardation (Rth) in a thickness direction of these polyester films has a positive value.

In JP4888853B and JP2012-256014A, such a polyester film having large optical anisotropy is used in a display apparatus and the like, and thus even when polarized sunglasses are used, excellent visibility is able to be obtained. In addition, when the polyester film is used as a polarizer protection film, rainbow-like color unevenness (rainbow unevenness) does not occur at the time of being observed from an inclined direction.

SUMMARY OF THE INVENTION

However, in the polyester film described above, when a view angle is changed, rainbow unevenness occurs, and thus the rainbow unevenness is not insufficiently reduced and is required to be further reduced.

In addition, in the polyester film having large optical anisotropy of the related art, heat resistance or moisture resistance is insufficient, and thus is not suitable for a transparent conductive film which is formed through a heating step.

Therefore, the present inventors have considered to provide an optical film in which visibility is able to be sufficiently ensured, and heat resistance or moisture resistance is excellent in order to solve such problems of the related art.

As a result of intensive studies for solving the problems described above, the present inventors have found that, in an optical film used in a display apparatus including a polarizer, retardation (Re) in an in-plane direction is 1,000 nm to 30,000 nm, and retardation (Rth) in a thickness direction is less than 0 nm, and thus heat resistance or moisture resistance is able to be improved, and visibility is able to be excellent.

Specifically, the present invention has the following configurations.

[1] An optical film used in a display apparatus including a polarizer, in which Re is 1,000 nm to 30,000 nm, and Rth is −30,000 nm to −1,000 nm.

[2] The optical film according to [1], in which a thickness of the optical film is 10 μm to 500 μm.

[3] The optical film according to [1] or [2], in which an equilibrium moisture content of the optical film at 25° C. and relative humidity of 60% is less than or equal to 0.1 wt %.

[4] The optical film according to any one of [1] to [3], in which a distortion temperature under load of the optical film is higher than or equal to 105° C.

[5] The optical film according to any one of [1] to [4], in which the optical film is a polystyrene-based film.

[6] The optical film according to [5], in which the polystyrene-based film contains crystalline polystyrene.

[7] The optical film according to [5] or [6], in which the polystyrene-based film has a syndiotactic structure.

[8] A polarization plate including the optical film according to any one of [1] to [7]; and a polarizer.

[9] A transparent conductive film including the optical film according to any one of [1] to [7]; and a conductive layer.

[10] A surface protection film using the optical film according to any one of [1] to [7].

[11] A liquid crystal display apparatus using the optical film according to any one of [1] to [7].

According to the present invention, it is possible to obtain an optical film in which visibility is able to be sufficiently ensured, and heat resistance or moisture resistance is excellent. The optical film of the present invention has the properties as described above, and thus is able to be preferably used for a transparent conductive film.

DESCRIPTION OF THE PREFERRED EMBODIMENTS

Hereinafter, the present invention will be described in detail. The following description of configuration requirement is based on a representative embodiment or a specific example, but the present invention is not limited to such an embodiment. Furthermore, herein, a numerical range denoted by using "to" indicates a range including numerical values described before and after "to" as a lower limit value and an upper limit value.

(Optical Film)

The present invention relates to an optical film used in a display apparatus including a polarizer. The film of the present invention is able to be preferably used as an optical purpose film which is used in a display apparatus including a polarizer, and is able to be particularly preferably used as an optical compensation film. In the optical film of the present invention, Re is 1,000 nm to 30,000 nm, and Rth is −30,000 nm to −1,000 nm. That is, one aspect of the optical film of the present invention contains a negative birefringence resin. The negative birefringence resin indicates a resin in which the refractive index of light in an alignment direction is smaller than the refractive index of the light in a direction orthogonal to the alignment direction when light is incident on a layer formed by monoaxially aligning molecules.

In the optical film of the present invention, Re is 1,000 nm to 30,000 nm, and Rth is −30,000 nm to −1,000 nm. Re is more preferably 3,000 nm to 20,000 nm, and is even more preferably 5,000 nm to 20,000 nm. In addition, Rth is more preferably −20,000 nm to −3,000 nm, and is even more preferably −20,000 nm to −5,000 nm. Thus, by setting the retardation of the optical film in an in-plane direction and in a thickness direction to be in the range described above, it is possible to suppress the occurrence of rainbow unevenness when the optical film is incorporated in a display apparatus, and in particular, it is possible to widen a view angle in which the rainbow unevenness does not occur, compared to the related art.

Here, the retardation (Re) of the optical film in the in-plane direction is defined by Expression (1) described below, and the retardation (Rth) of the optical film in the thickness direction is defined by Expression (2) described below.

$$Re = (nx-ny) \times d \quad (1)$$

$$Rth = \{(nx+ny)/2 - nz\} \times d \quad (2)$$

In Expressions (1) and (2), nx represents the refractive index of the optical film in an in-plane slow axis direction, ny represents the refractive index of the optical film in an in-plane fast axis direction, nz represents the refractive index of the optical film in the thickness direction, and d represents the thickness of the optical film.

The retardation (Re) of the optical film in the in-plane direction and the retardation (Rth) of the optical film in the thickness direction are able to be measured at a light ray wavelength of 550 nm by using KOBRA 21ADH or WR manufactured by Oji Scientific Instruments. Re is measured in a state where an incidence light ray is perpendicular to the film surface. Rth is obtained by gradually changing an angle between the incidence light ray and the film surface, by measuring a phase difference value at each angle, by obtaining nx, ny, and nz which are three-dimensional refractive indices according to curve fitting using a known expression of a refractive index ellipsoid, and by inputting nx, ny, and nz into Rth={(nx+ny)/2−nz}×d. Furthermore, at this time, the average refractive index of the film is necessary, and thus the average refractive index is able to be separately measured by using an Abbe's refractometer (a product name of "Abbe's Refractometer 2-T", manufactured by Atago Co., Ltd.).

It is preferable that the film thickness of the optical film of the present invention is 10 μm to 500 μm. The film thickness of the optical film is more preferably 15 μm to 400 μm, is even more preferably 15 μm to 300 μm, and is still more preferably 20 μm to 200 μm. Furthermore, when the optical film of the present invention is used in a display apparatus and the like, the film thickness of the optical film is able to be less than or equal to 100 μm, is more preferably less than or equal to 80 μm, and is even more preferably less than or equal to 60 μm, from a viewpoint of thinning.

An equilibrium moisture content of the optical film of the present invention at 25° C. and relative humidity of 60% is preferably less than or equal to 0.1 wt %, is more preferably less than or equal to 0.05 wt %, and is even more preferably less than or equal to 0.03 wt %. The equilibrium moisture content is set to be in the range described above, and thus when the optical film is used in a display apparatus in which an electrostatic capacitance type touch panel is incorporated, it is possible to suppress water absorptivity, and therefore, it is possible to reduce a change in a dielectric constant. For this reason, even when the optical film is placed in a high humidity environment, the optical film is preferably used for a display apparatus without decreasing a response speed.

In addition, in the present invention, a distortion temperature under load of the optical film is preferably higher than or equal to 105° C., is more preferably higher than or equal to 120° C., and is even more preferably higher than or equal to 150° C. The distortion temperature under load is set to be in the range described above, and thus even when the optical film is in a high temperature environment, it is possible to use the optical film, and in particular, the optical film is suitable for a support body of a transparent conductive film, and the like.

Here, in the distortion temperature under load of the optical film, a temperature at which the dimension of the film starts to be changed in a temperature range of 25° C. to 200° C. is able to be obtained as the distortion temperature under load by applying load of 0.1 N/mm$^2$ and by using a thermomechanical device (TMA).

It is preferable that the glass transition temperature of the negative birefringence resin used in the present invention is higher than or equal to 100° C. The glass transition temperature of the film of the present invention is preferably 100° C. to 200° C., is more preferably 110° C. to 175° C., and is particularly preferably 110° C. to 150° C. Furthermore, in the glass transition temperature of the film of the present invention, the film of the present invention is put into a measurement pan, is heated to 30° C. to 300° C. at 10° C./minute in a nitrogen gas flow by using a differential scanning calorimeter (DSC) (1st-run), is cooled to 30° C. at −10° C./minute, and is heated again to 30° C. to 300° C. at 10° C./minute (2nd-run). In the 2nd-run, a temperature at which a baseline starts to be biased from a low temperature side is set to a glass transition temperature (Tg), and thus the glass transition temperature of the film of the present invention is able to be obtained.

(Birefringence Resin)

The optical film of the present invention contains a resin exhibiting negative birefringence properties. The resin exhibiting negative birefringence properties is not particularly limited insofar as these conditions are satisfied, but when the film of the present invention is prepared by using a melting and extruding method, it is preferable that a material having excellent moldability of melting and extruding is used, and from this viewpoint, a cyclic olefin-based resin (however, excluding a positive birefringence resin, that is, a resin in which the refractive index of light in an alignment direction is larger than the refractive index of light in a direction orthogonal to the alignment direction when the light is incident on a layer formed by monoaxially aligning molecules), a cellulose acylate-based resin (however, excluding a positive birefringence resin), a maleimide-based resin, a polystyrene-based resin, an acrylic resin, a styrene-based resin such as polystyrenes, a polyacrylonitrile-based resin, and a polyvinyl acetal-based resin are able to be used. In the present invention, among them, it is particularly preferable that the polystyrene-based resin is used, and it is preferable that the optical film of the present invention is the polystyrene-based film.

The negative birefringence resin used in the present invention may contain one type of resin, or may contain two or more types of resins which are different from each other. In addition, one type of resin independently exhibiting negative birefringence properties may be independently used, and when two or more types of resins are blended with each other and the resins exhibit negative birefringence properties, two or more types of resins may be used together. When the negative birefringence resin is polymer blend formed of a resin which is an independently negative birefringence resin and a resin which is an independently positive birefringence resin, a mixing ratio of the resin which is the independently negative birefringence resin to the resin which is the independently positive birefringence resin is different according to the size of the absolute value of the intrinsic birefringence values of both of the resins, expressing properties of the birefringence properties at a molding temperature, and the like. In addition, the polymer blend may contain other components other than the resin which is the independently negative birefringence resin and the resin which is the independently positive birefringence resin. The other components are not particularly limited insofar as the effect of the present invention is not impaired, but the other components are able to be suitably selected according to the purpose, and examples of the other components suitably include a compatibilizing agent and the like. The compatibilizing agent is able to be suitably used when phase separation occurs at the time of blending, and it is possible to make a mixed state of the resin which is the independently negative birefringence resin and the resin which is the independently positive birefringence resin excellent by using the compatibilizing agent.

(Polystyrene-Based Film)

The birefringence resin used in the present invention is more preferably the polystyrene-based resin, and the polystyrene-based resin which is able to be used in the present invention indicates a copolymer of a resin obtained by polymerizing styrene and a derivative thereof as a main component and other resins, but is not particularly limited insofar as the effect of the present invention is not impaired, and a known polystyrene-based thermoplastic resin and the like are able to be used. In particular, it is preferable that a copolymer resin is used in which birefringence, film strength, and heat resistance are able to be improved.

Examples of the copolymer resin include a styrene-acrylonitrile-based resin, a styrene-acrylic resin, a styrene-maleic anhydride-based resin, a multi-component (binary, ternary, and the like) copolymerization polymer thereof, and the like. Among them, the styrene-acrylic resin or the styrene-maleic anhydride-based resin is preferably from a viewpoint of heat resistance and film strength.

In the styrene-maleic anhydride-based resin, a mass compositional ratio of styrene and maleic anhydride is preferably styrene:maleic anhydride=95:5 to 50:50, and is more preferably styrene:maleic anhydride=90:10 to 70:30. In addition, in order to adjust intrinsic birefringence, a resin in which hydrogen is added to a styrene-based resin is able to be preferably used. "Daylark D332" manufactured by Nova Chemicals Corporation and the like are able to be used as the styrene-maleic anhydride-based resin. In addition, "Delpet 980N" described below which is manufactured by Asahi Kasei Chemicals Corporation and the like are able to be used as the styrene-acrylic resin.

It is preferable that the polystyrene-based film of the present invention includes crystalline polystyrene. In addition, the polystyrene-based film of the present invention may have a syndiotactic structure, an isotactic structure, or an atactic structure, and it is preferable that the polystyrene-based film has the syndiotactic structure. The polystyrene-based resin having the syndiotactic structure is particularly excellent from a viewpoint of high mechanical strength and a small thermal shrinkage rate. The syndiotactic-polystyrene-based polymer used in the present invention has a stereoscopic structure where phenyl groups or derivatives thereof which are side chains with respect to a main chain formed of a carbon-carbon bond are positioned in opposite directions, and the stereoregularity (tacticity) thereof is generally quantified by using a nuclear magnetic resonance method (a $^{13}$C-NMR method) of isotopic carbon and has excellent accuracy. When an existence ratio of a plurality of continuous configuration units, for example, is 2, the stereoregularity measured by the $^{13}$C-NMR method is able to be denoted by a dyad, when the existence ratio is 3, the stereoregularity is able to be denoted by a triad, and when the existence ratio is 5, the stereoregularity is able to be denoted by a pentad. The styrene-based polymer having the syndiotactic structure in the present invention has stereoregularity which is generally 75% to 100% in a racemic dyad, and is preferably 85% to 100% in a racemic dyad, or is 30% to 100% in a racemic pentad, and is preferably 50% to 100% in a racemic dyad. Specifically, examples of the styrene-based polymer having the syndiotactic structure include stereoregularity polystyrene, poly(alkyl styrene), poly(halogenated styrene), poly(halogenated alkyl styrene), poly(alkoxy styrene), and poly(vinyl benzoic acid ester). Here, examples of the poly(alkyl styrene) include poly (methyl styrene), poly(ethyl styrene), poly(propyl styrene), poly(butyl styrene), poly(phenyl styrene), poly(vinyl naphthalene), poly(vinyl styrene), poly(acenaphthyne), and the like. In addition, examples of the poly(halogenated styrene) include poly(chlorostyrene), poly(bromostyrene), poly(fluorostyrene), and the like. In addition, examples of the poly (alkoxy styrene) include poly(methoxy styrene), poly (ethoxy styrene), and the like. Among them, the poly (styrene) and the poly(methyl styrene) are more preferable, and the poly(styrene) is even more preferable.

These syndiotactic-polystyrene-based polymers may be copolymers other than the homopolymers described above. Examples of a comonomer component of the copolymer are able to include an olefin monomer such as ethylene, propylene, butene, hexene, and octene, a diene monomer such as butadiene and isoprene, a cyclic olefin monomer, a cyclic diene monomer, a polar vinyl monomer such as methyl methacrylate, maleic anhydride, and acrylonitrile, and the like in addition to monomers configuring the styrene-based polymer described above. Among them, a comonomer component is preferable in which alkyl styrene, styrene hydride, and halogenated styrene are copolymerized with styrene as a main component. Among them, p-methyl styrene, m-methyl styrene, p-tertiary butyl styrene, p-chlorostyrene, m-chlorostyrene, p-fluorostyrene, and styrene hydride are preferable, and the p-methyl styrene is particularly preferable. The added amount of the comonomer components is preferably 0 wt % to 30 wt %, is more preferably 1 wt % to 20 wt %, and is even more preferably 3 wt % to 10 wt %, with respect to the total polymer. According to this copolymerization, a crystallization rate decreases, and the occurrence of a spherocrystal is suppressed. As a result thereof, it is possible to attain a syndiotactic-polystyrene-based film having high transparency and high folding endurance.

In addition, the syndiotactic-polystyrene-based polymer and other polymer may be used by being blended with each other. A styrene-based polymer having the syndiotactic structure as described above or a styrene-based polymer having an atactic structure is preferable as a preferred polymer blend component from a viewpoint of compatibility. Among them, in particular, a styrene-based polymer is preferable in which a homopolymer having a syndiotactic structure or an atactic structure formed by containing polystyrene having a syndiotactic structure as a main component, and by containing p-methyl styrene, m-methyl styrene, p-tertiary butyl styrene, p-chlorostyrene, m-chlorostyrene, p-fluorostyrene, styrene hydride, and the like as a constituent, and/or a copolymer having a syndiotactic structure or an atactic structure formed of at least one type of monomer thereof and styrene are blended with each other. In particular, a styrene-based polymer is preferable in which a copolymer of p-methyl styrene having a syndiotactic structure or p-methyl styrene having a syndiotactic structure and styrene is blended with polystyrene having a syndiotactic structure. The add amount of the polymers to be blended is preferably 0 wt % to 30 wt %, is more preferably 1 wt % to 20 wt %, and is even more preferably 3 wt % to 10 wt %, with respect to the total amount of the polymers.

In the molecular weight of the syndiotactic-polystyrene-based polymer used in the present invention, weight average molecular weight is preferably 100,000 to 800,000, and is particularly preferably 200,000 to 600,000. Further, in a molecular weight distribution, weight average molecular weight (Mw)/number average molecular weight (Mn) is preferably 1.5 to 5, and is more preferably 2 to 4. Such a syndiotactic-polystyrene-based polymer, for example, is able to be manufactured by polymerizing a styrene-based monomer (a monomer corresponding to the constituent of the styrene-based polymer described above) in an inactive hydrocarbon solvent or in the absence of a solvent by using a condensation product of a titanium compound, water, and trialkyl aluminum as a catalyst (JP1987-187708A (JP-S62-187708A)). Alternatively, the syndiotactic-polystyrene-based polymer is able to be manufactured by performing polymerization by using a compound formed of a titanium compound, a cation, and an anion in which a plurality of groups are bonded to an element as a catalyst (JP1992-249504A (JP-H04-249504A)).

As described above, examples of a commercial product of syndiotactic polystyrene include Xarec (manufactured by Idemitsu Kosan Co., Ltd.).

(Additives)

The optical film of the present invention may contain materials in addition to the resins exhibiting negative birefringence properties described above. Examples of the materials other than the resins include various additives such as a stabilizer, an ultraviolet absorbent, a light stabilizer, a plasticizer, fine particles, and an optical adjusting agent. Furthermore, specific examples of the additives are able to be based on the additives disclosed in paragraphs "0054" to "0065" of JP2010-137422A.

(Other Aspects)

Furthermore, the optical film of the present invention may be a multilayer film in which a high retardation film and a low retardation film are laminated. For example, examples of the film in which optical properties of the present invention (Re is 1,000 nm to 30,000 nm, and Rth and −30,000 nm to −1,000 nm) are satisfied include a multilayer film in which a layer containing a non-liquid crystalline high molecular organic compound as a main component and a layer formed by fixing homeotropic alignment of a composition containing a rod-like liquid crystal as a main component are laminated on a film having small retardation such as a TAC film. Furthermore, specific examples of the non-liquid crystalline high molecular organic compound or the rod-like liquid crystal are able to be based on non-liquid crystalline high molecular organic compounds or rod-like liquid crystals disclosed in JP2013-50482A.

(Manufacturing Method of Optical Film)

The optical film of the present invention is able to be formed by using either a solution film forming method or a melt film forming method. In order to attain the retardation of the optical film of the present invention in the in-plane direction and in the thickness direction, it is preferable that a stretching step is provided. Hereinafter, a film forming method of a single-layer optical film as the optical film of the present invention will be described in detail.

(Melt Film Formation)

(1) Melting

It is preferable that the resin exhibiting negative birefringence properties is mixed and pelletized before melt film formation. According to the pelletization, surging in a hopper of a melting extruder is suppressed, and thus stable supply is able to be performed. In a preferred size of the pellet, a sectional area is 1 mm$^2$ to 300 mm$^2$, and a length is 1 mm to 30 mm.

The pellet of the resin is put into the melted and extruder, and is dehydrated at 100° C. to 200° C. for 1 minute to 10 hours, and then is kneaded and extruded. The kneading is able to be performed by using a monoaxial or biaxial extruder.

In general, an uniaxial extruder having comparatively low equipment costs is frequently used as the type of extruder, examples of the uniaxial extruder include a screw type extruder such as a full-flight extruder, a Maddox extruder, and a Dulmage extruder, and the full-flight type extruder is preferable. In addition, a biaxial extruder is able to be used in which a vent port is disposed in the middle of the extruder by changing a screw segment, and thus the extrusion is able to be performed while devolatilizing unnecessary volatile components. The biaxial extruder is broadly classified into a same-direction type biaxial extruder and a different-direction type biaxial extruder, either of them is able to be used, and a same-direction rotation type biaxial extruder is preferable in which a residual portion is rarely generated and self-cleaning performance is high. The biaxial extruder has high kneading properties and high supply performance of the resin, and thus extrusion at a low temperature is able to be performed, and the biaxial extruder is suitable for the film formation of the present invention.

(2) Filtration

In order to filter foreign substances in the resin or to avoid damage of a gear pump due to the foreign substances, so-called breaker plate type filtration is preferably performed in which a filter material is disposed in an outlet of the extruder. In addition, in order to filter the foreign substances with high accuracy, it is preferable that a filtration device in which a so-called leaf type disk filter is incorporated is provided after passing through the gear pump. The filtration is able to be performed by disposing a filtration portion in one place, or multi-stage filtration may be performed in a plurality of places. It is preferable that filtration accuracy of the filter material is high, and the filtration accuracy is preferably 15 μm to 3 μm, and is more preferably 10 μm to 3 μm, from a viewpoint of pressure resistance of the filter material or an increase in a filtration pressure due to clogging of the filter material. In particular, when the leaf type disk filter device is used in which foreign substance filtration is performed finally, it is preferable that a filter material having high filtration accuracy is used from a viewpoint of quality, and the filter material is able to be adjusted according to the number of loadings in order to ensure pressure resistance and suitability of filter life. It is preferable that a steel material is used as the type of filter material from a viewpoint of using the filter material at high temperature and high pressure, and among the steel materials, stainless steel, steel, and the like are particularly preferably used, and the stainless steel is particularly preferably used from a viewpoint of corrosion. For example, a sintered filter material formed by sintering a metal long fiber or a metal powder is able to be used as the configuration of the filter material in addition to a filter material in which a wire material is woven, and the sintered filter material is preferable from a viewpoint of filtration accuracy and filter life.

(3) Gear Pump

In order to improve thickness accuracy, it is important that a variation in a discharge amount is reduced, and it is preferable that a constant amount of resin is supplied from the gear pump by disposing the gear pump between the extruder and a dice. The gear pump is contained in a state where a pair of gears formed of a drive gear and a driven gear are engaged to each other, and in the gear pump, both gears are engagedly rotated by driving the drive gear, a melted resin is suctioned into a cavity from a suction port formed in a housing, and similarly, a constant amount of the resin is discharged from a discharge port formed in the housing. Even when the pressure of the resin in a tip portion of the extruder slightly varies, the variation is absorbed by using the gear pump, a variation in the pressure of the resin on a downstream of a film forming device is extremely reduced, and thus thickness variation is reduced. A variation width in the pressure of the resin in a die portion is able to be in a range of ±1% by using the gear pump.

In order to improve constant amount supply performance by using the gear pump, a method is able to be used in which the number of rotations of the screw is changed, and thus the pressure before the gear pump is controlled such that the pressure is constant. In addition, a gear pump with high accuracy using three or more gears is effective in which a variation in the gear of the gear pump is eliminated.

(4) Die

The resin is melted by the extruder configured as described above, and the melted resin is continuously transported to a die through the filtration machine and the gear pump, as necessary. Any type of die such as a T die, a fishtail die, and a hanger coat die which are generally used is able to be used as the die insofar as the die is designed such that the residual melted resin in the dice is reduced. In addition, a static mixer may be immediately before the die in order to increase uniformity of the temperature of the resin. The clearance of a die outlet portion may be generally 1.0 time to 5.0 times the film thickness, is preferably 1.2 times to 3 times the film thickness, and more preferably 1.3 times to 2 times the film thickness. When the lip clearance is greater than or equal to 1.0 time the film thickness, an excellent surface-like sheet is easily obtained by the film formation, and thus setting the lip clearance to be greater than or equal to 1.0 time the film thickness is preferable. In addition, when the lip clearance is less than or equal to 5.0 times the film thickness, thickness accuracy of the sheet easily increases, and thus setting the lip clearance to be less than or equal to 5.0 times the film thickness is preferable. The die is an extremely important facility which determines the thickness accuracy of the film, and a die is preferable in which thickness adjustment is able to be exactly controlled. In addition, a design is important in which temperature unevenness or flow rate unevenness in a width direction of the die is reduced to the maximum extent.

(5) Cast

In the method described above, the melted resin which is extruded into the shape of a sheet by the die is cooled and solidified on a casting drum, and thus an unstretched film is obtained. At this time, methods such as a static electricity applying method, an air knife method, an air chamber method, a vacuum nozzle method, and a touch roll method are used, and it is preferable that adhesiveness between a casting drum and the melted and extruded sheet increases. Such an adhesiveness improving method may be performed with respect to the entire surface of the melted and extruded sheet, or may be performed with respect to a part of the surface of the melted and extruded sheet. In particular, a method of adhering only both end portions of the film, which is referred to as edge pinning, is generally used, but the method is not limited thereto.

It is more preferable that the casting drum is gradually cooled by using a plurality of cooling rolls. In particular, the resin may be comparatively excellently cooled by using three cooling rolls in general, but the number of cooling rolls is not limited. The diameter of the roll is preferably 50 mm to 5,000 mm, and an interval between a plurality of rolls is preferably 0.3 mm to 300 mm between the surfaces.

The temperature of casting drum is preferably Tg (of the resin exhibiting negative birefringence properties) −70° C. to Tg+20° C., is more preferably Tg−50° C. to Tg+10° C., and is even more preferably Tg−30° C. to Tg+5° C.

In addition, when a so-called touch roll method is used, the surface of a touch roll may be a resin such as rubber or Teflon (registered trademark), or may be a metal roll. Further, the thickness of the metal roll is thinned, and thus the surface of the roll is slightly recessed due to a pressure at the time of being touched, a crimping area is widened, and a roll which is referred to as a flexible roll is able to be used.

The temperature of the touch roll is preferably Tg−70° C. to Tg+20° C., is more preferably Tg−50° C. to Tg+10° C., and is even more preferably Tg−30° C. to Tg+5° C.

(6) Stretching

As described above, it is preferable that a cast film which is extruded onto the cast drum (an unstretched raw material) is stretched such that the optical properties of the present invention are expressed. In this case, it is preferable that the cast film is stretched in at least a monoaxial direction of a vertical (MD) direction and a horizontal (TD) direction, and may be biaxially stretched in the vertical (MD) direction and the horizontal (TD) direction. When the cast film is biaxially stretched in the vertical direction and the horizontal direction, the stretching may be performed according to a sequence of the vertical direction→the horizontal direction and a sequence of the horizontal direction→the vertical direction, or may be concurrently performed in two directions. Further, for example, it is preferable that the stretching is performed in a multi-stage such as the vertical direction→the vertical direction→the horizontal direction, the vertical direction→the horizontal direction→the vertical direction, and the vertical direction→the horizontal direction→the horizontal direction.

The vertical stretching is able to be attained by disposing two or more nip rolls in general, and by setting the peripheral speed of the nip roll on an outlet side to be higher than that of the nip roll on an inlet side while allowing a heated raw material to pass through the two or more nip rolls. At this time, as described above, it is preferable that a temperature difference occurs between the front side and the back side.

In addition, it is preferable that the raw material is preheated before the vertical stretching. The preheating temperature is preferably Tg (of the resin exhibiting negative birefringence properties) −50° C. to Tg+30° C., is more preferably Tg−40° C. to Tg+15° C., and is even more preferably Tg−30° C. to Tg. Such preheating may be performed by being in contact with a heating roll, may be performed by using a radiation heat source (an IR heater, a halogen heater, and the like), or may be performed by blowing off hot air.

It is preferable that the vertical stretching is performed at Tg−10° C. to Tg+50° C., is more preferably performed at Tg to Tg+40° C., and is even more preferably performed at Tg to Tg+30° C. The stretching ratio is preferably 1.1 times to 5.5 times, and is more preferably 1.3 times to 3 times. Furthermore, here, the stretching ratio is a value obtained by the following expression.

Stretching Ratio=(Length after Stretching−Length before Stretching)/(Length before Stretching)

After the vertical stretching, the cooling is preferably performed at Tg−50° C. to Tg, is more preferably performed at Tg−45° C. to Tg−5° C., and is even more preferably performed at Tg−40° C. to Tg−10° C. Such cooling may be performed by being in contact with a cooling roll, or may be performed by blowing off cool air.

It is preferable that the horizontal stretching is performed by using a tenter. That is, the horizontal stretching is able to be performed by widening a clip in a width direction while gripping both ends of the film with the clip and transporting a heat treatment zone.

A preferred stretching temperature is Tg−10° C. to Tg+50° C., is more preferably Tg to Tg+40° C., and is even more preferably Tg to Tg+30° C. The stretching ratio is preferably 1.1 times to 5.5 times, and is more preferably 1.3 times to 3 times.

In the stretching step, it is preferable that a heat treatment is performed with respect to the film after the stretching treatment.

The heat treatment is performed with respect to the film at approximately Tg+10° C. to Tg+50° C. (more preferably, Tg+15° C. to Tg+30° C.) for 1 second to 60 seconds (more preferably, 2 seconds to 30 seconds). It is preferable that thermal fixing is continuously performed after the horizontal stretching in a state of being gripped by a chuck in the tenter, and at this time, a chuck interval may be a width at the time of ending the horizontal stretching, may be wider than the width, or may be narrower than the width. According to the heat treatment, it is possible to adjust Re and Rth to be in the range of the present invention.

(7) Winding

It is preferable that both ends of the sheet obtained in this way are trimmed and wound. The trimmed portion may be subjected to a pulverization treatment or may be subjected to a pelletization treatment or a treatment such as depolymerization and repolymerization as necessary, and then may be reused as a raw material for the same type of film or a raw material for the different type of film. Any type of cutter such as a rotary cutter, a shearing blade, and a knife may be used as a trimming cutter. Either carbon steel or stainless steel may be used as the material. In general, it is preferable that a cemented carbide blade and a ceramic blade are used from a viewpoint of elongating the life of the cutter and of suppressing the occurrence of a chip.

In addition, it is preferable that a laminated film is attached to at least one surface before the winding from a viewpoint of preventing a defect. A preferred winding tension is 1 kg/m width to 50 kg/width, is more preferably 2 kg/m width to 40 kg/width, and is even more preferably 3 kg/m width to 20 kg/width. When the winding tension is greater than or equal to 1 kg/m width, it is preferable that the film is easily homogeneously wound. In addition, when the winding tension is less than or equal to 50 kg/width, the film is not strongly wound, but winding appearance is excellent, and a bump portion of the film does not extend due to a creep phenomenon and thus does not cause waving of the film, or residual birefringence due to the stretching of the film does not occur. The winding tension is detected by tension controlling in the middle of a line, and it is preferable that the winding is performed while being controlled such that the winding tension is constant. When there is a difference in the temperature of the film, the length of the film may be slightly different according to the place of the film forming line due to thermal expansion, and thus it is necessary that tension of greater than or equal to the definition is not applied to the film in the middle of the line by adjusting a draw ratio between the nip rolls.

The winding is able to be performed at a constant tension by controlling the winding tension, and it is preferable that suitable winding tension is set by performing tapering according to a winding diameter. In general, the tension gradually decreases as the winding diameter becomes larger, and according to a case, it may be preferable that the tension increases as the winding diameter becomes larger. Such a winding method is able to be similarly applied to the following solution film forming method.

(Solution Film Formation)

(1) Film Formation

When the optical film is formed by using a solution film forming method, first, the resin exhibiting negative birefringence properties is dissolved in a solvent. When the resin is dissolved in the solvent, the total concentration of the resin is preferably 3 mass % to 50 mass %, is more preferably 5 mass % to 40 mass %, and is even more preferably 10 mass % to 35 mass %. The viscosity of the obtained solution at a room temperature is generally 1 (mPa·s) to 1,000,000 (mPa·s), is preferably 10 (mPa·s) to 100,000 (mPa·s), is more preferably 100 (mPa·s) to 50,000 (mPa·s), and is particularly preferably 1,000 (mPa·s) to 40,000 (mPa·s).

Examples of the solvent to be used are able to include an aromatic solvent such as benzene, toluene, and xylene, a cellosolve-based solvent such as methyl cellosolve, ethyl cellosolve, and 1-methoxy-2-propanol, a ketone-based solvent such as diacetone alcohol, acetone, cyclohexanone, methyl ethyl ketone, 4-methyl-2-pentanone, ethyl cyclohexanone, and 1,2-dimethyl cyclohexane, an ester-based solvent such as methyl lactate and ethyl lactate, a halogen-containing solvent such as 2,2,3,3-tetrafluoro-1-propanol, methylene chloride, and chloroform, an ether-based solvent such as tetrahydrofuran and dioxane, and an alcohol-based solvent such as 1-pentanol and 1-butanol.

In addition, in addition to the above description, it is preferable that a solvent is used in which an SP value (a parameter for the degree of solubility) is usually in a range of 10 $(MPa^{1/2})$ to 30 $(MPa^{1/2})$. The solvent described above is able to be independently used or two or more types thereof are able to be used together. When two or more types of the solvents are used together, it is preferable that the range of the SP value as a mixture is in the range described above. At this time, the SP value as the mixture is able to be obtained from the mass ratio thereof, and for example, when two or more types of mixtures are used, the mass fraction of the respective solvents are set to W1 and W2, and the SP values are set to SP1 and SP2, the SP value of the mixed solvent is able to be obtained as a value calculated by the following expression.

SP Value=$W1 \cdot SP1 + W2 \cdot SP2$

Further, in order to improve surface smoothness of the optical film, a leveling agent may be added. Any general leveling agent is able to be used, and for example, a fluorine-based nonionic surfactant, a special acrylic resin-based leveling agent, a silicone-based leveling agent, and the like are able to be used as the leveling agent.

In general, examples of a method of manufacturing the optical film by using a solvent casting method include a method in which the solution described above is applied onto a substrate such as a metal drum, a steel belt, a polyester film of polyethylene terephthalate (PET), polyethylene naphthalate (PEN), or the like, and a polytetrafluoroethylene belt by using a dice or a coater, and then the solvent is dried and removed, and the film is peeled off from the substrate.

In addition, a resin solution is applied onto the substrate by using means such as a spray, a brush, roll spin coating, and dipping, and then the solvent is dried and removed, the film is peeled off from the substrate, and thus the optical film is able to be manufactured. Furthermore, the thickness, the surface smoothness, and the like may be controlled by repeating the coating.

In addition, when the polyester film is used as the substrate, a film which is subjected to a surface treatment may be used. Examples of a method of the surface treatment include a hydrophilization treatment method which is generally performed, for example, a method of laminating an acrylic resin or a sulfonate group-containing resin by coating or laminating, a method of improving hydrophilicity of the film surface by a corona discharge treatment and the like, or the like.

(2) Drying

A drying (solvent removing) step of the solvent casting method described above is not particularly limited, but is able to be performed by using a method which is generally used, for example, a method of allowing the solvent to pass a drying furnace through a plurality of rollers, and when air bubbles are generated according to evaporation of the solvent in the drying step, properties of the film remarkably decrease, and thus in order to avoid this, it is preferable that the drying step is a plurality of steps of two or more steps, and the temperature or the air volume in each of the steps is controlled.

In addition, the amount of residual solvent in the optical film is generally less than or equal to 10 mass %. Thus, it is possible to further reduce a sticking mark trouble by decreasing the amount of residual solvent, and thus it is preferable that the amount of residual solvent decreases.

(3) Stretching

As described above, it is preferable that the obtained optical film is stretched in at least a monoaxial direction of the vertical direction (MD) or the horizontal direction (TD), and it is more preferable that the optical film is biaxially stretched in the vertical direction (MD) and in the horizontal direction (TD). The stretching method at the time of the melt film formation is able to be adopted as a stretching method.

(Polarization Plate)

A polarization plate of the present invention includes the optical film described above and a polarizer. The polarization plate includes the polarizer, and protection films disposed on both sides of the polarizer, and at least one of the protection films is the optical film of the present invention. In the optical film, it is preferable that a contact angle of the surface of a transparent support body on a side opposite to a light scattering layer side or an antireflection layer side, that is, the surface on a side at which the transparent support body is bonded to the polarizer with respect to water, is in a range of 10 degrees to 50 degrees. For example, an adhesive layer is disposed on one surface of the optical film of the present invention, and the optical film is able to be arranged on the outermost surface of the display.

(Transparent Conductive Film)

The optical film of the present invention is able to be used in a transparent conductive film. The transparent conductive film includes a conductive layer, and the optical film as a transparent resin film. The conductive layer may be formed in the shape of a layer, and it is preferable that the conductive layer is formed to include an intermittent portion. The intermittent portion indicates a portion in which the conductive layer is not disposed, and it is preferable that the outer circumference of the intermittent portion is surrounded by the conductive layer. In the present invention, the expression "the conductive layer is formed to include the intermittent portion" indicates that the conductive layer is formed in the shape of a pattern or a mesh. For example, conductive layers disclosed in JP2013-1009A, JP2012-216550A, JP2012-151095A, JP2012-25158A, JP2011-253546A, JP2011-197754A, JP2011-34806A, JP2010-198799A, JP2009-277466A, JP2012-216550A, JP2012-151095A, WO2010/140275A, and WO2010/114056A are able to be exemplified as the conductive layer.

It is more preferable that the conductive layer used in the present invention contains silver and a hydrophilic resin. Examples of a water soluble resin include gelatin, polyvinyl alcohol (PVA), polyvinyl pyrrolidone (PVP), polysaccharide such as starch, cellulose and a derivative thereof, polyethylene oxide, polyvinyl amine, chitosan, polylysine, a polyacrylic acid, a polyalginic acid, a polyhyaluronic acid, a carboxy cellulose, and the like. These water soluble resins have neutral properties, anionic properties, and cationic properties according to ionic properties of a functional group. Among them, the gelatin is particularly preferable.

It is particularly preferable that silver halide photographic sensitive material is used in the conductive layer used in the present invention. When the silver halide photographic sensitive material is used, the following three aspects are included in a manufacturing method of the conductive layer according to the aspect of a photosensitive material and a developing treatment.

(1) An aspect in which a black and white photosensitive silver halide photographic sensitive material which does not include physical development nuclei is subjected to chemical development or thermal development, and thus a metal silver portion is formed on the photosensitive material.

(2) An aspect in which a black and white photosensitive silver halide photographic sensitive material which includes physical development nuclei in a silver halide emulsion layer is subjected to solution physical development, and thus a metal silver portion is formed on the photosensitive material.

(3) An aspect in which a black and white photosensitive silver halide photographic sensitive material which does not include physical development nuclei and an image receiving sheet including a non-photosensitive layer which includes physical development nuclei are superposed and are subjected to diffusion transfer development, and thus a metal silver portion is formed on the non-photosensitive image receiving sheet.

The aspect of (1) described above is an integrated black and white developing type manufacturing method, and a transmissive conductive film such as a light transmissive conductive film is formed on the photosensitive material. Development silver to be obtained is a filament having a high specific surface area which is chemical development silver or thermal development silver, and thus has high activity in the subsequent plating process or physical developing process.

In the aspect of (2) described above, silver halide particles closely related to physical development nuclei are dissolved, and are deposited on the development nuclei, and thus a transmissive conductive film such as a light transmissive conductive film is formed on the photosensitive material in an exposed portion. The aspect of (2) described above is also an integrated black and white developing type manufacturing method. Developing action indicates eduction onto the physical development nuclei, and thus activity is high, and the development silver is in the shape of a sphere having a small specific surface area.

In the aspect of (3) described above, silver halide particles are dissolved and diffused, and are deposited on the development nuclei on the image receiving sheet, and thus a transmissive conductive film such as a light transmissive conductive film is formed on the image receiving sheet in an unexposed portion. The aspect of (3) described above is a so-called separate type manufacturing method, and is used by peeling off the image receiving sheet from the photosensitive material.

In all of the aspects, when either a negative type developing treatment or a reversal developing treatment is able to be selected. Furthermore, when the manufacturing method is a diffusion transfer type manufacturing method, an automatic positive type photosensitive material is used as the photosensitive material, and thus the negative type developing treatment is able to be performed.

Here, chemical development, thermal development, solution physical development, and diffusion transfer development have the literal meaning of terms generally used in the art, and are explained in the photographic chemical general textbook, for example, "Photographic Chemical" authorized by Shinichi KIKUCHI (published by Kyoritsu Shuppan Co., Ltd. in 1955) and "The Theory of Photographic Processes, 4th ed." edited by C. E. K. Mees (Published by Macmillan Publishers in 1977). The present invention relates to a liquid treatment, and a technology of applying a thermal developing type manufacturing method as other developing type manufacturing methods is also able to be used as a reference. For example, technologies disclosed in each of the publications of JP2004-184693A, JP2004-334077A, and JP2005-010752A, and each of the specifications of JP2004-244080 and JP2004-085655 are able to be applied.

In the present invention, a silver salt emulsion layer which becomes the conductive layer may contain additives such as a solvent or a dye in addition to a silver salt and a binder. Examples of the silver salt include an inorganic silver salt such as silver halide and an organic silver salt such as silver acetate. In the present invention, it is preferable that silver halide having excellent properties as an optical sensor is used.

A solvent used for forming the silver salt emulsion layer is not particularly limited, and examples of the solvent are able to include water, an organic solvent (for example, alcohols such as methanol, ketones such as acetone, amides such as formamide, sulfoxides such as dimethyl sulfoxide, esters such as ethyl acetate, ethers, and the like), an ionic liquid, and a mixed solvent thereof.

A protective layer may be disposed on the silver salt emulsion layer. In the present invention, the protective layer indicates a layer formed of a binder such as gelatin or a high molecular polymer, and in order to express an effect of preventing a scratch or improving mechanical properties, the protective layer is formed on the silver salt emulsion layer having photosensitivity. It is preferable that the thickness of the protective layer is less than or equal to 0.5 µm. A coating method and a forming method of the protective layer are not particularly limited, and a known coating method and a known forming method are able to be suitably selected. For example, protective layers disclosed in JP2008-250233A and the like are able to be used as a reference.

Further, in the present invention, other functional layers such as an undercoat layer or an antistatic layer may be disposed. Undercoat layers disclosed in paragraphs "0021" to "0023" of JP2008-250233A are able to be applied as the undercoat layer. In addition, antistatic layers disclosed in paragraphs "0012", "0014" to "0020" of JP2008-250233A are able to be applied as the antistatic layer.

Furthermore, the transparent conductive film described above is suitable for a touch panel, and for example, the touch panel is able to be prepared according to the disclosure in paragraphs "0073" to "0075" of JP2009-176608A.

(Antireflection Film)

The optical film of the present invention is able to be used as a support body of an antireflection film. In a case of an image display apparatus having high definition and high quality such as a liquid crystal display apparatus (LCD), it is preferable that an antireflection film which is transparent and has antistatic performance for preventing a decrease in contrast due to reflection of external light on a display surface or reflected glare of the image is used in addition to the dust-proof properties described above.

(Display Apparatus)

The optical film of the present invention is able to be used in a mobile phone, a smart phone, a portable information terminal, a car navigation, a tablet PC, a vending machine, an ATM, a FA machine, and the like without any limitation. In addition, the optical film of the present invention is able to be used in various display apparatuses such as a liquid crystal display apparatus (LCD), a plasma display panel (PDP), an electroluminescence display (ELD), and a cathode tube display apparatus (CRT). It is preferable that the optical film of the present invention or the polarization plate is arranged on a visible side of a display screen of an image display apparatus.

<Liquid Crystal Display Apparatus>

It is particularly preferable that the optical film of the present invention or the polarization plate is used in the outermost layer of a display of a liquid crystal display apparatus or the like. The liquid crystal display apparatus includes a liquid crystal cell, and polarization plates arranged on both sides of the liquid crystal cell, and the liquid crystal cell supports a liquid crystal between two electrode substrates. Further, one optical anisotropic layer is arranged between the liquid crystal cell and one polarization plate, or two optical anisotropic layers are arranged between the liquid crystal cell and both of the polarization plates.

It is preferable that the liquid crystal cell is in a TN mode, a VA mode, an OCB mode, an IPS mode, or an ECB mode.

In the liquid crystal cell in the TN mode, rod-like liquid crystalline molecules are substantially horizontally aligned at the time of not applying a voltage, and are twistedly aligned by 60° to 120°.

The liquid crystal cell in the TN mode is most commonly used as a color TFT liquid crystal display apparatus, and is disclosed in a plurality of literatures.

In the liquid crystal cell in the VA mode, rod-like liquid crystalline molecules are substantially perpendicularly aligned at the time of not applying a voltage.

The liquid crystal cell in the VA mode includes (1) a liquid crystal cell in a VA mode in the narrow sense in which rod-like liquid crystalline molecules are substantially perpendicularly aligned at the time of not applying a voltage and are substantially horizontally aligned at the time of applying a voltage (disclosed in JP1990-176625A (JP-H02-176625A)), (2) a liquid crystal cell (in an MVA mode) in which a multidomain of a VA mode is obtained in order to widen a view angle (disclosed in SID97, Digest of Tech. Papers (Proceedings) 28 (1997) 845), (3) a liquid crystal cell in a mode (in an n-ASM mode) in which rod-like liquid crystalline molecules are substantially perpendicularly aligned at the time of not applying a voltage and are twistedly aligned in multidomain at the time of applying a voltage (disclosed in Proceedings 58 and 59 of Japan Liquid Crystal Conference (1998)), and (4) a liquid crystal cell in a SURVAIVAL Mode (published in LCD International 98).

The liquid crystal cell in the OCB mode is a liquid crystal cell in a bend alignment mode in which rod-like liquid crystalline molecules are (symmetrically) aligned in substantially opposite directions in an upper portion and a lower portion of the liquid crystal cell, and is disclosed in each of the specifications of U.S. Pat. Nos. 4,583,825A and 5,410,422A. The rod-like liquid crystalline molecules are symmetrically aligned in the upper portion and the lower portion of the liquid crystal cell, and thus the liquid crystal cell in the bend alignment mode has a self-optical compensation function. For this reason, this liquid crystal mode is referred to as an Optically Compensatory Bend (OCB) liquid crystal mode. The liquid crystal display apparatus in the bend alignment mode has an advantage of a high response speed.

The liquid crystal cell in the IPS mode is a liquid crystal cell in a mode in which switching is performed by applying a horizontal electric field to a nematic liquid crystal, and specifically, is disclosed in Proc. IDRC (Asia Display '95), p. 577 to 580 and p. 707 to 710.

In the liquid crystal cell in the ECB mode, rod-like liquid crystalline molecules are substantially horizontally aligned at the time of not applying a voltage. The ECB mode is one of the modes of the liquid crystal display, which has the simplest structure, and for example, the details are disclosed in JP1993-203946A (JP-H05-203946A).

<Plasma Display Panel (PDP)>

In general, a plasma display panel (PDP) is configured of gas, a glass substrate, an electrode, an electrode lead material, a thick film printing material, and a fluorescent body. The glass substrate is formed of two substrates of a front glass substrate and a back glass substrate. An electrode and an insulating layer are formed on the two glass substrates. The back glass substrate is further formed of a fluorescent layer. The two glass substrates are incorporated, and a space between the glass substrates is sealed with gas.

Plasma display panels which are commercially available in advance are able to be used as the plasma display panel (PDP). The plasma display panel is disclosed in each of JP1993-205643A (JP-H05-205643A) and JP1997-306366A (JP-H09-306366A).

A front plate is arranged on the front surface of the plasma display panel. It is preferable that the front plate has sufficient strength in order to protect the plasma display panel. The front plate is able to be used by placing a gap with respect to the plasma display panel, and is able to be used by being directly bonded to a main body of a plasma display.

In an image display apparatus such as the plasma display panel, an optical filter is able to be directly bonded to the surface of the display. In addition, when the front plate is disposed before the display, the optical filter is able to be bonded to the front side (the outer side) or the back side (the display side) of the front plate.

(Organic EL Element)

The optical film of the present invention is able to be used as a substrate (a substrate film) or a protection film of an organic EL element or the like. When the film of the present invention is used in the organic EL element or the like, the contents disclosed in each of JP1999-335661A (JP-H11-335661A), JP1999-335368A (JP-H11-335368A), JP2001-192651A, JP2001-192652A, JP2001-192653A, JP2001-335776A, JP2001-247859A, JP2001-181616A, JP2001-181617A, JP2002-181816A, JP2002-181617A, JP2002-056976A, and the like are able to be applied. In addition, it is preferable that the contents disclosed in each of JP2001-148291A, JP2001-221916A, and JP2001-231443A are used together.

EXAMPLES

Hereinafter, the characteristics of the present invention will be more specifically described with reference to examples and comparative examples. Materials, used amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

Example 1

0.3 wt % of an antioxidant "Irganox1010" was mixed into a commercially available syndiotactic polystyrene resin Xarec 105 (manufactured by Idemitsu Kosan Co., Ltd.), was melted and extruded at 300° C. by using an uniaxial extruder of 30 mmϕ, and was adhered to a cooling roll at 50° C. by using an electrostatic pinning method, and thus an unstretched film was formed. At this time, a screen filter, a gear pump, and a leaf type disk filter were sequentially arranged between an extruder and a die, were connected to each other through a melt pipe, and were extruded from a die having a width of 450 mm and a lip gap of 1 mm.

Next, the unstretched film was stretched in a horizontal direction at a temperature of 115° C. and a stretching ratio of 3.8 times, and was subjected to a heat treatment for 10 seconds while being relaxed by 5% in a width direction at a temperature of 200° C., and thus a stretched film having a thickness of 100 μm was prepared, physical properties of the obtained stretched film were measured, and the results thereof were shown in Table 1.

Examples 2 to 6

Stretched films of Examples 2 to 6 were obtained by the same method as that in Example 1 except that an extruded amount was changed, and the thickness of the unstretched film was changed in Example 1.

Example 7

A stretched film of Example 6 was obtained by the same method as that in Example 1 except that the material was changed to a commercially available atactic polystyrene resin HF77 (manufactured by PS Japan Corporation) in Example 6.

Example 8

A stretched film of Example 7 was obtained by the same method as that in Example 1 except that the material was changed to a commercially available modified acrylic resin Delpet 980N (manufactured by Asahi Kasei Chemicals Corporation) in Example 6.

Comparative Example 1

A film of Comparative Example 1 was prepared according to a method disclosed in Example of JP2011-215646A, and the evaluation results were shown in Table 1.

(Evaluation Method)

(Re and Rth)

Re and Rth were measured at a light ray wavelength of 550 nm by using KOBRA 21ADH or WR manufactured by Oji Scientific Instruments. An in-plane retardation value Re was measured in a state where an incidence light ray was perpendicular to the film surface. A film thickness direction retardation value Rth was obtained by gradually changing an angle between the incidence light ray and the film surface, by measuring a retardation value at each angle, by obtaining nx, ny, and nz which are three-dimensional refractive indices according to curve fitting using a known expression of a refractive index ellipsoid, and by inputting nx, ny, and nz into Rth={(nx+ny)/2−nz}×d. Furthermore, at this time, the average refractive index of the film is necessary, and thus the average refractive index is able to be separately measured by using an Abbe's refractometer (a product name of "Abbe's refractometer 2-T", manufactured by Atago Co., Ltd.).

(Wavelength Dispersion)

The in-plane retardation Re was measured at a light ray wavelength of 450 nm and 650 nm by using KOBRA 21ADH or WR manufactured by Oji Scientific Instruments, and a wavelength dispersion was measured from the following expression.

Wavelength Dispersion=$Re$(450 nm)/$Re$(650 nm)

(Moisture Content)

The film was placed under an environment of a temperature of 25° C. and relative humidity of 60% for 24 hours, and then a moisture content was measured by using a Karl Fischer moisture titrator MKC610 manufactured by Kyoto Electronics Manufacturing Co., Ltd.

(Distortion Temperature Under Load)

A load of 0.1 N/mm$^2$ was applied by using Q400 manufactured by TA Instruments, a temperature was increased at 5° C./min from a temperature of 25° C. to a temperature of 160° C., and then a temperature at which dimensional change occurred was measured.

(Wrinkle in Coating Step)

When the film prepared in the present application passed through steps of preparing a silver mesh type transparent conductive film described below, wrinkle failure which occurred was evaluated on a four level scale.

A: The film was able to pass through the steps without having wrinkles.

B: The wrinkles occurred in a part of the film, but the quality was not affected.

C: The wrinkles occurred in a part of the film, and a part of the quality was affected.

D: The wrinkles occurred, and the quality deteriorated.

(Visibility)

The prepared film was bonded to one side of a polarizer formed of PVA and iodine such that an absorption axis of the polarizer and an alignment main axis of the film were perpendicular to each other or parallel to each other, and a TAC film (manufactured by Fujifilm Corporation, a thickness of 80 μm) was bonded to the surface of the polarizer on the other side, and thus a polarization plate was prepared. The obtained polarization plate was disposed on a exit ray side of a liquid crystal display apparatus using a white LED formed of a light emitting element in which a blue light emitting diode and an yttrium.aluminum.garnet-based yellow fluorescent body were combined as a light source (NSPW500CS, manufactured by Nichia Corporation) such that a polyester film was disposed on a visible side. This liquid crystal display apparatus included the polarization plate using two TAC films on an incidence ray side of a liquid crystal cell as a polarizer protection film. A view angle (a panel front surface was 0°) at which rainbow unevenness occurred was measured by performing visual observation from a front surface and an inclined direction of the polarization plate of the liquid crystal display apparatus.

(Responsiveness Under High Humidity Environment)

A transparent conductive layer described below was formed on the transparent conductive film prepared in the present invention, was incorporated in the touch panel, and was placed under two environments of a temperature of 25° C. and relative humidity of 60%, and a temperature of 60° C. and relative humidity of 90% for 24 hours, and thus a difference in responsiveness of the touch panel was evaluated on a four level scale.

A: The difference was not observed in the operation of the touch panel.

B: The difference was slightly observed in a part of the operation of the touch panel, but was practically allowable.

C: The difference was observed in the operation of the touch panel, in particular, in a frame portion of the touch panel.

D: The difference was observed in the operation of the touch panel on the entire surface of the touch panel.

TABLE 1

| Unit | Support Body | | Performance Evaluation | | | | | | | Responsiveness under Humidity Environment |
|---|---|---|---|---|---|---|---|---|---|---|
| | Resin — | Film Thickness μm | Re nm | Rth nm | Wavelength Dispersion — | Moisture Content wt % | Distortion Temperature under Load ° C. | Wrinkles in Coating Step — | Visibility — | — |
| Example 1 | SPS | 100 | 8000 | −9000 | 1.10 | 0.03 | 150 | A | Not Generated | A |
| Example 2 | SPS | 15 | 2000 | −2300 | 1.10 | <0.01 | 150 | A | Generated at Greater than or Equal to 40° | A |
| Example 3 | SPS | 45 | 4200 | −4800 | 1.10 | <0.01 | 150 | A | Generated at Greater than or Equal to 50° | A |
| Example 4 | SPS | 75 | 6000 | −7000 | 1.10 | <0.01 | 150 | A | Generated at Greater than or Equal to 60° | A |
| Example 5 | SPS | 200 | 16000 | −17000 | 1.10 | 0.05 | 150 | A | Not Generated | B |
| Example 6 | SPS | 300 | 24000 | −25000 | 1.10 | 0.07 | 150 | A | Not Generated | B |

TABLE 1-continued

| | Support Body | | | | Performance Evaluation | | | | | Responsiveness under Humidity Environment |
|---|---|---|---|---|---|---|---|---|---|---|
| | | | | | | Distortion | | | | |
| Unit | Resin — | Film Thickness μm | Re nm | Rth nm | Wavelength Dispersion — | Moisture Content wt % | Temperature under Load °C. | Wrinkles in Coating Step — | Visibility — | — |
| Example 7 | PS | 300 | 8000 | −9000 | 1.10 | 0.01 | 100 | C | Not Generated | A |
| Example 8 | Modified Acrylic | 300 | 6000 | −3000 | 1.09 | 0.25 | 120 | B | Generated at Greater than or Equal to 60° | C |
| Comparative Example 1 | PET | 100 | 8000 | 9000 | 1.15 | 0.35 | 100 | D | Generated at Greater than or Equal to 60° | D |

In Table 1, when Example 1 is compared with Comparative Example 1, the film of Example 1 has a wider view angle at which the rainbow unevenness is not observed than that of the film of Comparative Example 1. This is a remarkable result.

According to known literature of KOIKE et al. (Japanese Journal of Applied Physics 50 (2011) 042602), it is disclosed that, when the retardation of the film is significant and the wavelength dispersion is significant, an effect of improving rainbow unevenness is significant. However, even though the film of the present invention has the same Re and the same Rth as those of the film of Example 1, and has a small wavelength dispersion, it is found that the film of the present invention has wide view angle. In addition, the film of the present invention has high heat resistance and a low moisture content, and thus a humidity change in the responsiveness of the touch panel decreases compared to Comparative Example 1, and the occurrence of the wrinkles in a coating step for forming an undercoat layer and a conductive layer is not a problem.

In Examples 2 to 6, Re and Rth are changed by changing the thickness of the film. In Examples 2 to 6, view angle are widened, and the occurrence of the wrinkles in the coating step is not a problem. In particular, in Examples 2 to 4, it is found that it is preferable that the humidity change in the responsiveness of the touch panel decreases.

In Examples 7 and 8, the effect of the present invention was confirmed by using a negative birefringence resin in addition to syndiotactic polystyrene. Even in this case, wide view angle are obtained, and the occurrence of the wrinkles in the coating step and the humidity change in the responsiveness of the touch panel are reduced to a certain degree.

As described above, it was found that the film of the present invention had wider view angle than those of the film of the related art, and when the film was used in a support body of a transparent conductive film, excellent performance was obtained.

(Preparation of Transparent Conductive Film)
<Undercoat Layer Coating>

One surface of the optical films of Example and Comparative Example formed as described above was subjected to a corona treatment, and then a first undercoat layer and a second undercoat layer was applied thereon. The composition and the coating method of the first undercoat layer and the second undercoat layer were as disclosed in paragraphs "0117" to "0120" of JP2010-256908A.

(Formation of Conductive Layer Containing Water Soluble Resin and Silver)

A silver halide photographic sensitive material described below was applied onto the undercoat layer described above, and thus a transparent conductive film was prepared.

<Silver Halide Photosensitive Material>

An emulsion which contains 10.0 g of gelatin with respect to 150 g of Ag in a water medium and silver iodobromochloride particles (I=0.2 mol % and Br=40 mol %) having an average equivalent spherical diameter of 0.1 μm was prepared. Furthermore, $K_3Rh_2Br_9$ and $K_2IrCl_6$ were added to the emulsion such that the concentration was $10^{-7}$ (mol/mol Silver), and silver bromide particles were doped with Rh ions and Ir ions. $Na_2PdCl_4$ was added to the emulsion, and gold-sulfur sensitization was performed by using gold chloride and sodium thiosulfate, and then silver was applied onto the undercoat layer of the transparent resin film described above such that the coating amount of the silver was 10 g/m² along with a gelatin hardening agent. At this time, a volume ratio of Ag:gelatin was 2:1.

The coating of 500 m was performed with a width of 0.7 m, and both ends of the coating were cut down such that 0.5 m of the center portion of the coating remained, and thus a roll-like silver halide photographic sensitive material was obtained.

<Exposure>

An exposure pattern was formed on the basis of a pattern illustrated in FIG. 1 of JP4820451B. An arrangement pitch Ps of a small grid 18 was 200 μm, and an arrangement pitch Pm of intermediate grids 20a to 20h was 2×Ps. In addition, the thickness of a conductive portion of the small grid 18 was 2 μm, and the width thereof was 10 μm. The exposure was performed through a photomask having the pattern described above by using parallel light of which a light source was a high pressure mercury lamp.

In addition, a conductive pattern was formed on the basis of FIG. 5 of JP4820451B, and in the following evaluation results, the same results as those of FIG. 1 were obtained.

<Developing Treatment>

The formulation of 1 L of a developer was as follows.

| | |
|---|---|
| Hydroquinone | 20 g |
| Sodium Sulfite | 50 g |
| Potassium Carbonate | 40 g |
| Ethylene Diamine•Tetraacetate | 2 g |
| Potassium Bromide | 3 g |
| Polyethylene Glycol 2000 | 1 g |
| Potassium Hydroxide | 4 g |

The pH was adjusted to be 10.3.

The formulation of 1 L of a fixer was as follows.

| | |
|---|---|
| Ammonium Thiosulfate Liquid (75%) | 300 ml |
| Ammonium Sulfite•Monohydrate | 25 g |
| 1,3-Diaminopropane•Tetraacetate | 8 g |

-continued

| Acetic Acid | 5 g |
|---|---|
| Ammonia Water (27%) | 1 g |

The pH was adjusted to be 6.2.

An exposed photosensitive material was treated in an automatic developing machine FG-71OPTS manufactured by Fujifilm Corporation under treatment conditions of developing at 35° C. for 30 seconds, fixing at 34° C. for 23 seconds, washing, and flowing water (5 L/minute) for 20 seconds by using the treatment agent described above.

(Preparation of Touch Panel)

A touch panel was prepared by using the transparent conductive film described above according to the disclosure in paragraphs "0073" to "0075" of JP2009-176608A. It is confirmed that the film of the present invention has excellent toughness, a small change in the shade, and excellent performance.

(Preparation of Antireflection Film)

A low reflection film was prepared by using the film of the present invention according to Example 47 of Japan Institute of Invention and Innovation (Public Technology No. 2001-1745), and excellent optical performance was obtained.

INDUSTRIAL APPLICABILITY

According to the present invention, it is possible to obtain an optical film in which heat resistance or moisture resistance is excellent, and visibility is able to be sufficiently ensured. For this reason, the optical film of the present invention is preferably used for a transparent conductive film or the like, and has high industrial applicability.

What is claimed is:

1. An optical film used in a display apparatus including a polarizer, wherein
   Re is greater than 3,000 nm to 30,000 nm, and Rth is −30,000 nm to −1,000 nm, and Re is retardation in an in-plane direction and Rth is retardation in a thickness direction.
2. The optical film according to claim 1, wherein
   a thickness of the optical film is 10 μm to 500 μm.
3. The optical film according to claim 1, wherein
   an equilibrium moisture content of the optical film at 25° C. and relative humidity of 60% is less than or equal to 0.1 wt %.
4. The optical film according to claim 1, wherein
   a distortion temperature under load of the optical film is higher than or equal to 105° C.
5. The optical film according to claim 1, wherein
   the optical film is a polystyrene-based film.
6. The optical film according to claim 5, wherein
   the polystyrene-based film contains crystalline polystyrene.
7. The optical film according to claim 5, wherein
   the polystyrene-based film has a syndiotactic structure.
8. A polarization plate, comprising:
   the optical film according to claim 1; and
   a polarizer.
9. A transparent conductive film, comprising:
   the optical film according to claim 1; and
   a conductive layer.
10. A surface protection film using the optical film according to claim 1.
11. A liquid crystal display apparatus using the optical film according to claim 1.
12. The optical film according to claim 1, wherein the Re is 4,200 nm to 30,000 nm.

* * * * *